US012331269B2

(12) United States Patent
Hashimoto et al.

(10) Patent No.: US 12,331,269 B2
(45) Date of Patent: Jun. 17, 2025

(54) CLEANING COMPOSITION, AEROSOL, CLEANING SPRAYER, AND CLEANING METHOD

(71) Applicant: THREEBOND CO., LTD., Hachioji (JP)

(72) Inventors: Shogo Hashimoto, Hachioji (JP); Manabu Kirino, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 205 days.

(21) Appl. No.: 18/186,612

(22) Filed: Mar. 20, 2023

(65) Prior Publication Data

US 2023/0348823 A1 Nov. 2, 2023

(30) Foreign Application Priority Data

Mar. 30, 2022 (JP) ................................ 2022-056197

(51) Int. Cl.

| | |
|---|---|
| ***C11D 7/50*** | (2006.01) |
| ***C11D 7/30*** | (2006.01) |
| ***C11D 17/00*** | (2006.01) |

(52) U.S. Cl.

CPC .............. *C11D 7/5018* (2013.01); *C11D 7/30* (2013.01); *C11D 17/0043* (2013.01); *C11D 2111/18* (2024.01)

(58) Field of Classification Search

CPC ..... C11D 7/30; C11D 7/5018; C11D 17/0043; C11D 2111/18; B01J 13/0095; B65D 83/386; B08B 3/02; B08B 3/08

See application file for complete search history.

(56) References Cited

U.S. PATENT DOCUMENTS

2021/0207065 A1* 7/2021 Matsumoto ............ C11D 7/261

FOREIGN PATENT DOCUMENTS

| | | | |
|---|---|---|---|
| JP | H03131699 A * | 6/1991 | |
| JP | 2020-041090 A | 3/2020 | |

* cited by examiner

*Primary Examiner* — Vishal V Vasisth

(74) *Attorney, Agent, or Firm* — LUCAS & MERCANTI, LLP

(57) ABSTRACT

A cleaning composition has reduced erodibility to members having plastic base materials, suitable dryability, and non-flammability. The cleaning composition contains components (A) and (B) below in a mass ratio between component (A) and component (B) of 85:15 to 55:45, and being hydrocarbon-based solvent-free: (A): cis-1-chloro-3,3,3-trifluoropropene; and (B): a fluorine-based solvent having a boiling point of 65° C. to 80° C. and a specific gravity of 1.55 to 1.65, excluding component (A).

8 Claims, No Drawings

CLEANING COMPOSITION, AEROSOL, CLEANING SPRAYER, AND CLEANING METHOD

BACKGROUND OF THE INVENTION

Field of Invention

The present invention relates to a cleaning composition having reduced erodibility to plastic base materials, an aerosol and a cleaning sprayer including the same, and a cleaning method involving use of the same.

Description of Related Art

Cleaning agents for cleaning industrial parts are conventionally used to clean fats and oils adhering to the surfaces of industrial machines and transportation machines, electric and electronic devices, construction materials and the like. In particular, transportation machines, such as automobiles, electric trains, tractors, ships, airplanes and forklifts, have fats and oils for lubrication, cooling or the like adhering on various parts of driving units and sliding units. The fats and oils are scattered upon driving, and contaminants present in the circumferential environment are adhered thereto during driving. Thus, their surfaces are contaminated.

When such contamination is removed, cleaning agents containing hydrocarbon-based solvents have been used. These solvents, which are high in flammability, fall under hazardous materials in Fire Service Act. If falling under hazardous materials, the installation of warehouses for the hazardous materials and management thereof are necessary, and the cost for the introduction and maintenance are necessary. Accordingly, non-hazardous cleaning agents have been demanded.

Japanese Patent Laid-open No. 2020-041090 discloses a cleaning composition containing a fluorine-based solvent which is a non-hazardous material.

The cleaning agent including a fluorine-based solvent disclosed in Japanese Patent Laid-open No. 2020-041090, however, unfortunately erodes plastic base materials made of polycarbonate or the like. Further the cleaning agent has poor workability due to its low dryability.

The present invention has been made in consideration of the above-mentioned situation, and an object thereof is to provide a cleaning composition that has reduced erodibility to members having plastic base materials, suitable dryability, and nonflammability. Further, another object of the present invention is to provide an aerosol or a cleaning sprayer including the cleaning composition. Further, still another object of the present invention is to provide a cleaning method involving use of the aerosol or the cleaning sprayer.

SUMMARY OF THE INVENTION

As a result of exhaustive studies to achieve the above objects, the present inventors have found that a cleaning composition described hereinafter in detail has reduced erodibility to members having plastic base materials, suitable dryability, and nonflammability, and this finding has led to the completion of the present Then, the gist of the present invention will be described.

[1]A cleaning composition comprising components (A) and (B) below in a mass ratio between component (A) and component (B) of 85:15 to 45:55, and being hydrocarbon-based solvent-free:

(A): cis-1-chloro-3,3,3-trifluoropropene; and (B): a fluorine-based solvent having a boiling point of 65° C. to 80° C. and a specific gravity of 1.55 to 1.65, excluding the component (A).

[2] The cleaning composition according to [1], wherein the boiling point of component (B) is 66 to 77° C., and the specific gravity of component (B) is 1.56 to 1.63.

[3] The cleaning composition according to [1] or [2], wherein component (B) has a molecular weight in the range of 150 to 500.

[4] The cleaning composition according to any one of [1] to [3], wherein component (B) is a hydrofluoroolofin perfluoroolefin containing neither chlorine atom nor ether bond.

[5]A cleaning aerosol filled with the cleaning composition according to any one of [1] to [4], and a propellant.

[6]A cleaning sprayer comprising a double-structure container having an inner bag inside thereof, wherein the inner bag is filled with the cleaning composition according to any one of [1] to [4].

[7]A cleaning method comprising spraying the cleaning composition according to any one of [1] to [4] on a contaminated portion of a member using the cleaning aerosol according to [5] or a cleaning sprayer according to [6] to thereby remove a contaminant.

[8] The cleaning method according to [7], wherein the member includes a plastic base material.

DETAILED DESCRIPTION OF THE PREFERRED EMBODIMENTS

The detail of the present invention will be described hereinafter. Here, the present invention is not limited only to the following embodiments. Herein, "X to Y" is used to mean that the numerical values (X and Y) as the lower limit value and the upper limit value are included, and therefore means "X or more and Y or less". "A and/or B" means A alone, or B alone, or the combination of A and B. Unless otherwise specified, operations and measurements of physical properties and the like are carried out under the condition of at room temperature (20 to 25° C.)/a relative humidity of 40 to 55% RH.

Cleaning Composition

A cleaning composition (hereinafter, referred to also simply as "composition") according to an aspect of the present invention contains components (A) and (B) in a mass ratio of component (A) and component (B) of 85:15 to 45:55, and is hydrocarbon-based solvent-free:

(A): cis-1-chloro-3,3,3-trifluoropropene; and (B): a fluorine-based solvent having a boiling point of 65° C. to 80° C. and a specific gravity of 1.55 to 1.65, excluding component (A).

The cleaning composition according to the aspect of the present invention has reduced erodibility to members having plastic base materials, suitable dryability, and nonflammability. Although the detail of this mechanism is unclear, it is conceivable that in cleaning of contaminated portions of members having plastic base materials, the erodibility to the members is reduced due to the mixing of component (A) and component (B) in a predetermined ratio. Further, according to such a specific constitution, the cleaning composition also has the suitable dryability and the nonflammability.

Hereinafter, there will be described each component contained in the cleaning composition according to the aspect of the present invention.

<Component (A)>

Component (A) to be used in the present invention is cis-1-chloro-3,3,3-trifluoropropene, and is a major component exhibiting the cleaning action on fats and oils. The mixing of component (A) with component (B) described later can bring about the excellent effects including the reduction in erodibility to members having plastic base materials, suitable dryability, and nonflammability. The kauri-butanol (KB) value of component (A) is preferably 10 or higher, and more preferably 20 or higher and most preferably 30 or higher, in view of the cleanability to fats and oils. The kauri-butanol value is an index to indicate capability of a sample for being saturated with fats and oils. The measurement method includes placing a certain amount of a kauri resin solution in butanol into a flask, putting the flask on a type-printed paper, dropping a sample therein and counting the number of milliliters of the sample when turbidity occurs to thereby fail to read the types. In the present invention, the excellent cleaning performance on fats and oils can be exhibited when the KB value is 10 or higher. Examples of commercially available products of for component (A) include 1233zd(Z), manufactured by Central Glass Co., Ltd.

<Component (B)>

Component (B) to be used in the present invention is a fluorine-based solvent having a boiling point of 60 to 80° C. and a specific gravity of 1.55 to 1.65, excluding the component (A). The mixing of component (B) with component (A) in the predetermined ratio can bring about the excellent effects including the reduction in erodibility to members having plastic base materials, suitable dryability, and nonflammability. The boiling point of the component (B) is preferably 66 to 77° C. and especially preferably 69 to 75° C. The specific gravity thereof is preferably 1.56 to 1.63 and especially preferably 1.57 to 1.61. The specific gravity in the present invention is a value measured in accordance with JIS Z 8804. The fluorine-based solvents for component (B) may be used singly or as a mixture of two or more thereof.

The molecular weight of the component (B) is not especially limited, but is, for example, 150 to 500, more preferably 250 to 400 and especially preferably 300 to 370. The molecular weight as used herein is a value determined by GC/MS.

Specific compounds as the component (B) are not especially limited, and examples thereof include perfluoroolefin (excluding the component (A)), and more specifically include perfluoroolefin containing neither chlorine atom nor ether bond. Herein, the perfluoroolefin is a fluorine-based compound having carbon atoms, and fluorine atoms, and having an unsaturated bond (specifically, carbon-carbon double bond) in the molecule. Commercially available products for component (B) include Opteon SF70, manufactured by Chemours-Mitsui Fluoroproducts Co., Ltd.

Component (B) is contained so that the mass ratio between component (A) and component (B) is 85:15 to 45:55. The mass ratio between component (A) and component (B) is preferably 80:20 to 50:50 and more preferably 80:20 to 55:45. The mass ratio in the above range can bring about the excellent effects including the reduction in erodibility to members having plastic base materials, suitable dryability, and nonflammability.

The cleaning composition of the present invention is characterized by being hydrocarbon-based solvent-free. Since hydrocarbon-based solvents are high in flammability, a cleaning composition that is free of them can be provided as a nonflammable cleaning composition. The hydrocarbon-based solvent includes n-hexane, isohexane, cyclohexane, ethylcyclohexane, methylcyclohexane, n-heptane, isoheptane, n-octane, isooctane, n-nonane, isononane, n-decane and isodecane. Herein, “free” of a component encompasses “substantially free” of the component, and includes the mode in which the substance of interest is contained due to contamination. Specifically, it means that the substance of interest is allowed to be present in an amount of 0.1% by mass or less (lower limit: 0% by mass) based on the total mass of the composition.

<Optional Components>

Optional components can be added to the cleaning composition as long as characteristics of the present invention are not impaired. Examples of the components include surfactants, ultraviolet absorbents, antioxidants, chelating agents, rust preventives and perfumes, and the components that can be dissolved or dispersed homogeneously in component (A) and component (B) can appropriately be selected. However, the cleaning composition of the present invention can achieve the objects of the present invention even when containing only component (A) and component (B), and accordingly, it is preferable that the cleaning component of the cleaning composition should be composed only of component (A) and component (B).

Cleaning Method

Examples of the cleaning method involving use of the cleaning composition of the present invention includes, but not limited to, wiping-out using waste cloth or the like, dipping, ultrasonic cleaning, and spraying using an aerosol or an airgun. According to an embodiment, there is provided a cleaning aerosol including a pressure-resistant container filled with the cleaning composition of the present invention and a propellant. According to another embodiment, the present invention also provides a cleaning sprayer including a double-structure container having an inner bag inside thereof, wherein the inner bag is filled with the cleaning composition of the present invention. The cleaning sprayer is preferably a cleaning sprayer including a container having a can and an inner bag therein filled with the cleaning composition of the present invention and, as required, a spray agent, wherein a compressed air is introduced to a vacant space between the inner bag and the can to press the inner bag by the compressed air for spraying. As the propellant and the spray agent, well-known substances can be used. Specifically, the propellant and the pray agent can be selected from dimethyl ether (DME), carbon dioxide, liquefied petroleum gas (LPG), nitrogen, nitrous oxide, isobutene, haloalkyls, hydrofluoroolefin, and compressed air. In view of easy availability, safety, environmental load and the like, hydrofluoroolefin, carbon dioxide and nitrogen are especially suitable and nitrogen is most preferable. According to an embodiment, the present invention provides a cleaning method including spraying the cleaning composition on a contaminated portion of a member using the aerosol or the cleaning sprayer to thereby remove a contaminant.

<Drying Condition>

The temperature range in which the cleaning composition of the present invention can be dried is not especially limited, and is, for example, −10° C. to 50° C. and preferably −5° C. to 35° C. In the present invention, the drying time is preferably 30 to 50 seconds and more preferably 35 to 45 seconds, in view of giving suitable dryability and excellent workability. When the drying time is 30 seconds or longer, unstuck contaminants can be removed completely before the cleaning composition is dried, whereby the cleaning effect can be secured. When the drying time is 50 seconds or shorter, the workability of the cleaning process can be improved.

<Base Material>

The cleaning composition of the present invention, which has low erodibility to plastic base materials, are suitable to cleaning applications to plastic base materials or composite members composed of a plastic base material and a metal base material. The plastic includes polystyrene, polyethylene, polycarbonate, polyacetal, polypropylene, 6-nylon, 6,6-nylon, PBT (polybutylene terephthalate), ABS (acrylonitrile-butadiene-styrene copolymers), FRP (fiber reinforced plastics), PMMA (acrylic resins), PPS (polyphenylene sulfide) and PEN (polyethylene naphthalate); and the metal includes iron, stainless steel, copper, nickel, zinc, aluminum, magnesium, gold and silver.

<Applications>

The cleaning composition of the present invention is excellent in the cleanability to fatty and oily smears of oils, greases and the like. The oils include, but not especially limited to, engine oils, gear oils, turbine oils, silicone oils, fluorocarbon oils and brake oils. The cleaning composition of the present invention is especially suitable to parts used in transportation machines such as automobiles, electric trains and airplanes, and is also suitable for cleaning of other machines. Then, the cleaning composition, which has low erodibility to plastic base materials, can suitably be used for cleaning composite members composed of a plastic base material and a metal base material. In addition to use in cleaning, the cleaning composition can be used in applications requiring removal of fats and oils or solid substances as contaminants, for example, removal of pressure-sensitive adhesives, bonding agents, and the like.

EXAMPLES

Then, the present invention will be described in more detail by way of Examples, but the present invention is not any more limited only to these Examples. Unless otherwise specified, the tests were carried out in the environment of 25° C. and 55% RH.

<Preparation of Cleaning Compositions>

Components were weighed in parts by mass indicated in Table 1, put in a stirring container, and stirred for 30 minutes using a stirrer. Details of amounts for preparation were as indicated in Table 1, in which the numerical values are all indicated in parts by mass.

<Each Component>

(A1) cis-1-chloro-3,3,3-trifluoropropene, molecular weight: 130.5, boiling point: 39° C., KB value: 34 (1233zd(Z), manufactured by Central Glass Co., Ltd.)

(B1) a perfluoroolefin containing neither chlorine atom nor ether bond, molecular weight (value calculated by GC/MS): 350, specific gravity: 1.60, boiling point: 71° C. (Opteon SF70, manufactured by Chemours-Mitsui Fluoroproducts Co., Ltd.)

(B'1) a perfluoropolyether, specific gravity: 1.31, boiling point: 55° C. (Galden SV55, manufactured by Solvay S. A.)

(B'2) a perfluoropolyether, specific gravity: 1.71, boiling point: 110° C. (Galden SV110, manufactured by Solvay S. A.)

(B'3) methoxyperfluoroheptene, specific gravity: 1.58, boiling point: 110° C. (Opteon SF10, manufactured by Chemours-Mitsui Fluoroproducts Co., Ltd.)

(B'4) a hydrofluoroether, specific gravity: 1.43, boiling point: 76° C. (Novec 7200, manufactured by 3M Japan Limited) (Hydrocarbon-based solvent) methylcyclohexane (Swaclean MCH, manufactured by Maruzen Petrochemical Co., Ltd.)

Test methods used in Examples and Comparative Examples in Table 1 were as follows.

<(1) Dryability>

A SUS304 plate of 75 mm in width and 150 mm in length was placed on a hot plate held at 30° C., and 100 μL of one of cleaning compositions of Examples and Comparative Examples was dropped thereon. The dried state of the cleaning composition was visually checked in the environment at 30° C. and 40 RH. The time until the cleaning composition was dried and disappeared was measured as a drying time (second). The results are shown in Table 1. Here, in the present invention, the drying time is preferably 30 to 50 seconds and more preferably 35 to 45 seconds, in view of giving suitable dryability and excellent workability.

<(2) Erodibility>

A polycarbonate plate (L-1225Y, manufactured by TEIJIN LIMITED) of 25 mm in width, 100 mm in length, and 2 mm in thickness was fixed on a test jig by tightening a bolt of the test jig while the plate was curved by applying a force thereto; and 1 mL of one of cleaning compositions of Examples and Comparative Examples was dropped on the curved portion. Thereafter, the resultant was allowed to stand still in the environment at 25° C. and 55% RH to be dried for 10 minutes, and the state of the polycarbonate plate was visually observed, and evaluated based on the following criteria. The results are shown in Table 1. Here, in the present invention, a cleaning composition having the erodibility rated good is preferable.

Evaluation Criteria good: no change was observed on the polycarbonate plate, or the plate had fine cracks on the surface, but was not broken.

poor: the polycarbonate plate was completely broken into two pieces.

<(3) Flammability>

1 g of one of cleaning compositions of Examples and Comparative Examples was put in an aluminum cup of 30 mm in diameter and 20 mm in height. Thereafter, the flammability was determined on the basis of the state of the cleaning composition when a lit matchstick was put close to the cup in the environment at 25° C. and 55% RH. The evaluation was made based on the following evaluation criteria. The results are shown in Table 1. In the present invention, a cleaning composition having the flammability rated good is preferable.

Evaluation Criteria good: the cleaning composition did not ignite.

poor: the cleaning composition ignited.

TABLE 1

| Component | Example 1 | Example 2 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| A1 | 80 | 50 | 90 | 40 | 80 | | 100 | 80 | 80 | 80 | 80 |
| B1 | 20 | 50 | 10 | 60 | 20 | 100 | | | | | |
| B'1 | | | | | | | | 20 | | | |
| B'2 | | | | | | | | | 20 | | |
| B'3 | | | | | | | | | | 20 | |
| B'4 | | | | | | | | | | | 20 |
| hydrocarbon-based solvent | | | | | 10 | | | | | | |
| (1) Dryability | 38 | 49 | 36 | 52 | 70 | 55 | 35 | 25 | 66 | 74 | 55 |
| (2) Erodibility | good | good | poor | good | good | good | poor | poor | good | good | good |
| (3) Flammability | good | good | good | good | poor | good | good | good | good | good | good |

It was confirmed that the cleaning compositions of Examples 1 and 2 in Table 1, which contained component (A) and component (B) according to the present invention in a predetermined ratio and were hydrocarbon-based solvent-free, had reduced erodibility to a member having a plastic base material, suitable dryability, and nonflammability. Among these, Example 1 exhibited especially excellent dryability.

The cleaning compositions of Comparative Examples 1 and 2, which contained component (A) and component (B) according to the present invention in a ratio out of the predetermined ratio, were inferior in terms of the erodibility or the dryability. The cleaning composition of Comparative Example 3, which contained a hydrocarbon-based solvent, was inferior in terms of the dryability and the flammability. The cleaning compositions of Comparative Examples 4 and 5, which did not contain one of component (A) and component (B) according to the present invention, were inferior in terms of the dryability or the erodibility. The cleaning compositions of Comparative Examples 6 to 9, which contained a component which was not the component (B) according to the present invention, were inferior in terms of the dryability or the erodibility.

INDUSTRIAL APPLICABILITY

The cleaning composition of the present invention, which has reduced erodibility to members having plastic base materials, suitable dryability, and nonflammability, can be developed for broad cleaning applications and are thus very useful.

The present application is based on Japanese Patent Application No. 2022-056197, filed on Mar. 30, 2022, the disclosure contents of which are incorporated herein by reference in its entirety.

What is claimed is:

1. A cleaning composition comprising components (A) and (B) below in a mass ratio between component (A) and component (B) of 85:15 to 45:55, and being hydrocarbon-based solvent-free:

(A): cis-1-chloro-3,3,3-trifluoropropene; and (B): a fluorine-based solvent having a boiling point of 65° C. to 80° C. and a specific gravity of 1.55 to 1.65, excluding component (A), wherein the component (B) is a perfluoroolefin that does not contain a chlorine atom or an ether bond.

2. The cleaning composition according to claim 1, wherein the boiling point of component (B) is 66 to 77° C., and the specific gravity of component (B) is 1.56 to 1.63.

3. The cleaning composition according to claim 1, wherein component (B) has a molecular weight in the range of 150 to 500.

4. An aerosol filled with the cleaning composition according to claim 1 and a propellant.

5. A cleaning sprayer comprising a double-structure container having an inner bag inside thereof, wherein the inner bag is filled with the cleaning composition according to claim 1.

6. A cleaning method comprising spraying the cleaning composition according to claim 1 on a contaminated portion of a member to thereby remove a contaminant.

7. The cleaning method according to claim 6, wherein the member includes a plastic base material.

8. The cleaning composition according to claim 1, wherein the component (B) is tetradecafluoroheptene.

* * * * *